(12) United States Patent
Huster et al.

(10) Patent No.: US 11,849,083 B2
(45) Date of Patent: Dec. 19, 2023

(54) IDENTIFYING ONE OF A SERVER AND A CLOUD SERVICE AS A CONTROLLER OF A MULTI-FUNCTION DEVICE

(71) Applicant: CANON EUROPA N.V., Amstelveen (NL)

(72) Inventors: Karsten Huster, Hamburg (DE); Chris Tickler, Harpenden (GB); Michael Rosemann, Wallenhorst (DE)

(73) Assignee: Canon Europa N.V., Amstelveen (NL)

( * ) Notice: Subject to any disclaimer, the term of this patent is extended or adjusted under 35 U.S.C. 154(b) by 0 days.

(21) Appl. No.: 17/635,217

(22) PCT Filed: Aug. 14, 2020

(86) PCT No.: PCT/EP2020/072932
§ 371 (c)(1),
(2) Date: Feb. 14, 2022

(87) PCT Pub. No.: WO2021/028589
PCT Pub. Date: Feb. 18, 2021

(65) Prior Publication Data
US 2022/0224798 A1    Jul. 14, 2022

(30) Foreign Application Priority Data
Aug. 15, 2019   (GB) ..................... 1911729

(51) Int. Cl.
    *H04N 1/00*      (2006.01)
    *G06F 3/12*       (2006.01)
    *H04N 1/44*      (2006.01)

(52) U.S. Cl.
    CPC ....... *H04N 1/00244* (2013.01); *G06F 3/1203* (2013.01); *G06F 3/1222* (2013.01);
(Continued)

(58) Field of Classification Search
None
See application file for complete search history.

(56) References Cited

U.S. PATENT DOCUMENTS

2006/0036871 A1   2/2006   Champine et al.
2012/0069385 A1   3/2012   Von Hatten et al.
(Continued)

FOREIGN PATENT DOCUMENTS

JP        2013239067 A     11/2013
WO    WO-2018236136 A1 * 12/2018  ........... G06F 3/1222

*Primary Examiner* — Thomas D Lee
(74) *Attorney, Agent, or Firm* — Canon U.S.A., Inc. IP Division

(57) ABSTRACT

A system comprising a multi-function device 112 configured to communicate with both a server 111 and a cloud service 121. The multi-function device 112 comprises: an output unit 407 configured to send S102, S401 identification information of the multi-function device 112 to the cloud service 121; an input unit 407 configured to receive S106, S403 controller information which identifies either the server 111 or the cloud service 121 as a controller of the multi-function device 112; and a login unit 406 configured to receive S201, S501 authentication information. The output unit 407 is further configured to send S202, S204 an authentication request including the authentication information to the controller 111, 121 identified by the controller information. The input unit 407 is further configured to receive S203, S205 an authentication response from the controller 111, 121 that indicates whether or not the authentication information is accepted.

19 Claims, 14 Drawing Sheets

(52) U.S. Cl.
CPC .......... *G06F 3/1231* (2013.01); *G06F 3/1238* (2013.01); *G06F 3/1287* (2013.01); *H04N 1/00962* (2013.01); *H04N 1/4406* (2013.01)

(56) References Cited

U.S. PATENT DOCUMENTS

| | | |
|---|---|---|
| 2016/0224279 A1 | 8/2016 | Kim et al. |
| 2017/0134615 A1 | 5/2017 | Onose |
| 2018/0375929 A1 | 12/2018 | Nosaki |
| 2019/0394188 A1* | 12/2019 | Kodama ............. H04L 63/0815 |

* cited by examiner

IDENTIFYING ONE OF A SERVER AND A CLOUD SERVICE AS A CONTROLLER OF A MULTI-FUNCTION DEVICE

TECHNICAL FIELD

The present invention relates to a multi-function device and a method of configuring a multi-function device. Furthermore, the multi-function device is registered with a server and a cloud service to allow access to different services from a display of the multi-function device. In particular, the multi-function device is configured to identify one of these multiple services as a controller of the multi-function device. The present invention also relates to a system comprising the above features, and a program configured to confer the above functionality.

BACKGROUND

Multi-function peripheral devices (MFPs) included in a network provide a variety of functions, such as the printing and scanning of documents. As is well known, an MFP may be configured to receive print jobs from a client, such as a laptop or PC, via a server. The server is a print, scan and/or device management server that may offer a number of services to the MFP.

In some MFP installations, such a server is provided on a local network, and is located in close vicinity to the MFP, so is referred to as an on-premise server (OPS). Close vicinity in this case might mean in the same building, same network, or same region as the MFPs. Often the network will include a single on-premise server. Sometimes the network will include a plurality of on-premise servers, each of which having dedicated functionality, such as a fail-over server providing a backup in the event of the main server being unavailable.

In the alternative, the print, scan and/or device management services may be provided externally to the network. Such services are typically accessed via the internet, and this is referred to as a cloud service (CS). The cloud service can be considered a virtual server, due to the server functionality in fact being provided by any one of a plurality of online servers. Such a plurality of online servers is often referred to as a cloud, due to being located externally and remotely from the network. Thus, it is appropriate in this context to refer to the MFP being configured to exchange information with a cloud service.

Accordingly, it is known that an MFP can be registered with one of an on-premise server or a cloud service. This registration of the MFP allows a user to login to the MFP, in order to access the services available on the one of the on-premise server or the cloud service with which it is registered.

An advantage of use of an on-premise server is that documents that are to be printed or have been scanned can be kept on the network, enhancing document security. On the other hand, cloud services have several advantages such as ability to update software centrally and lower IT service/maintenance costs for end users. Accordingly, there is a desire to offer both on-premise and cloud services at the same time.

SUMMARY

Aspects of the present invention are set out by the independent claims.

According to a first aspect, there is provided a multi-function device according to claim 1. According to a second aspect, there is provided a system according to claim 12. According to a third aspect, there is provided method according to claim 18. According to a fourth aspect, there is provided a program according to claim 19. According to a fifth aspect, there is provided a computer-readable storage medium according to claim 20.

BRIEF DESCRIPTION OF THE DRAWINGS

Embodiments will now be described, by way of example only, with reference to the accompanying drawings, in which.

DETAILED DESCRIPTION

Various embodiments, features, and aspects of the invention will be described in detail below with reference to the drawings. Each of the embodiments of the present invention described below can be implemented solely or as a combination of a plurality of the embodiments or features thereof where necessary or where the combination of elements or features from individual embodiments in a single embodiment is beneficial.

Figure 1A:
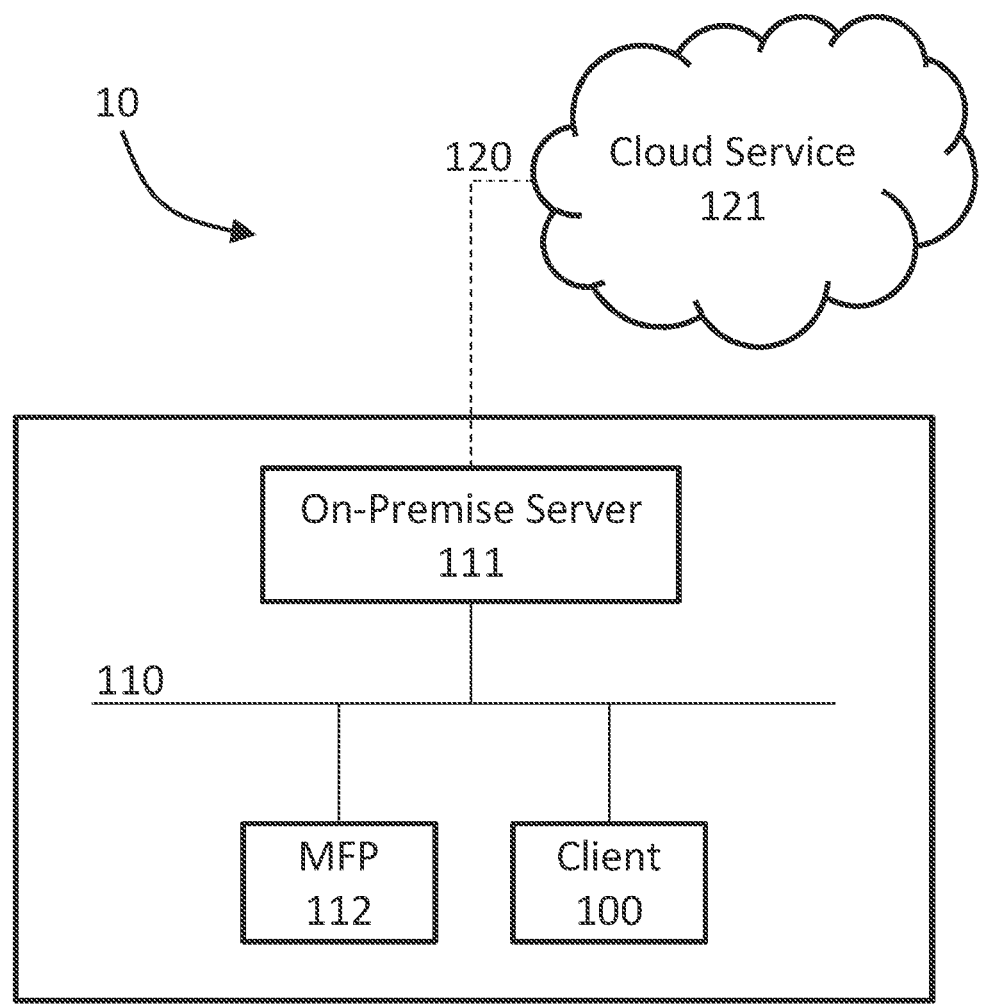
FIG. 1A illustrates an example of a system that includes an MFP connected an on-premise server via to an internal network and a cloud service via an external network.

FIG. 1A illustrates a print system 10 comprising a MFP 112 connected to an on-premise server (OPS) 111 via an internal network 110, and a cloud service (CS) 121 via an external connection such as the internet 120. A client computer 100 can also be connected to the internal network 110, and it can communicate with the on-premise server 111 and the MFP 112 via the internal network 110.

Furthermore, as will be described in more detail below, the MFP 112, the client computer 100, the on-premise server 111 and cloud service 121 communicate with each other to exchange information.

Figure 1B:
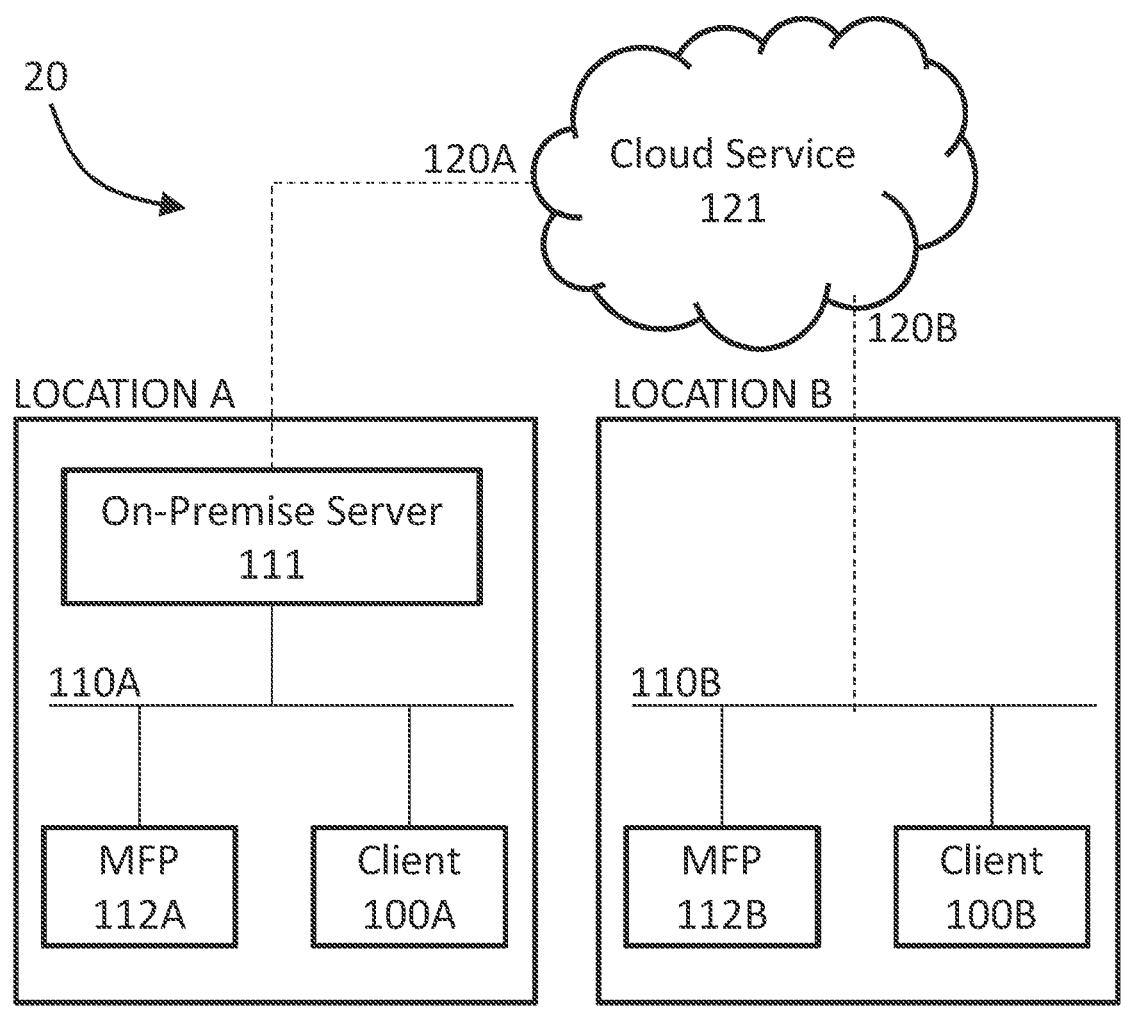
FIG. 1B illustrates an example of a system that includes a plurality of MFPs distributed across a plurality of locations.

FIG. 1B illustrates a print system 20 comprising corresponding features to FIG. 1A. However, a plurality of MFPs 112A, 112B and a plurality of clients 100A, 100B are provided in a plurality of locations A, B. Location A provides on-premise server 111, MFP 112A, and client 100A which communicate via network 110A. Location B provides MFP 112B and client 100B which communicate via network 110B, although location B does not include an on-premise server. Both location A and location B are configured to communicate with cloud service 121 via external network connections 120A, 120B.

The print system 20 is scalable, to permit a plurality of locations, each including a plurality of MFPs and clients, some of these locations including an on-premise server 111. A typical arrangement for the print system 20 would be a head office at location A including an on-premise server 111, and a branch office at location B that doesn't include an on-premise server.

Clients 100A and 100B, as well as MFPs 112A and 112B can be moved between locations A and B. The clients 100A, 100B and the MFPs 112A, 112B are configured to establish their location, in order to identify whether they are to be controlled by the on-premise server 111 or the cloud service 121.

When a user accesses an MFP 112A or 112B, the user should be presented with currently available function options. When a function is temporarily unavailable, perhaps due to a network disruption, once the functionality returns, the function is again provided to the user. Advantageously, the user experience is enhanced because if functionality is possible, then it is provided, even if the MFP 112A, 112B, has been moved. Thus, the availability of a function is dynamic to whether the MFP 112A, 112B can access the on-premise server 111 and/or the cloud service 121.

Figure 1C:
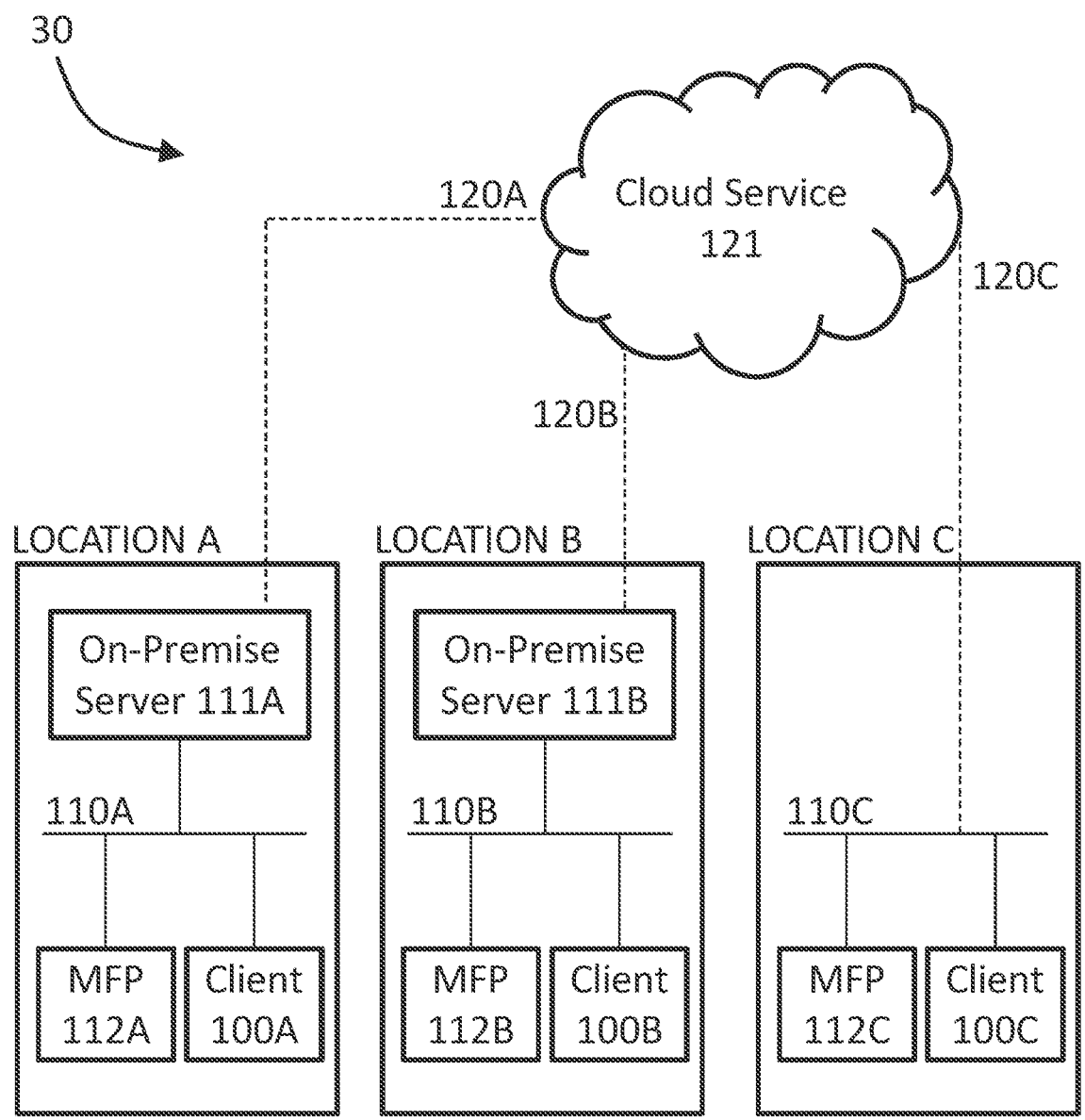
FIG. 1C illustrates an example of a system that includes a plurality of on-premise servers and a plurality of MFPs distributed across a plurality of locations.

FIG. 1C illustrates a further print system 30 comprising corresponding features to FIGS. 1A and 1B. However, a plurality of on-premise servers 111A-B, a plurality of MFPs 112A-C and a plurality of clients 100A-C are provided in a plurality of locations A-C. The print system shown in FIG. 1C will be described in more detail later on.

Figure 2A:
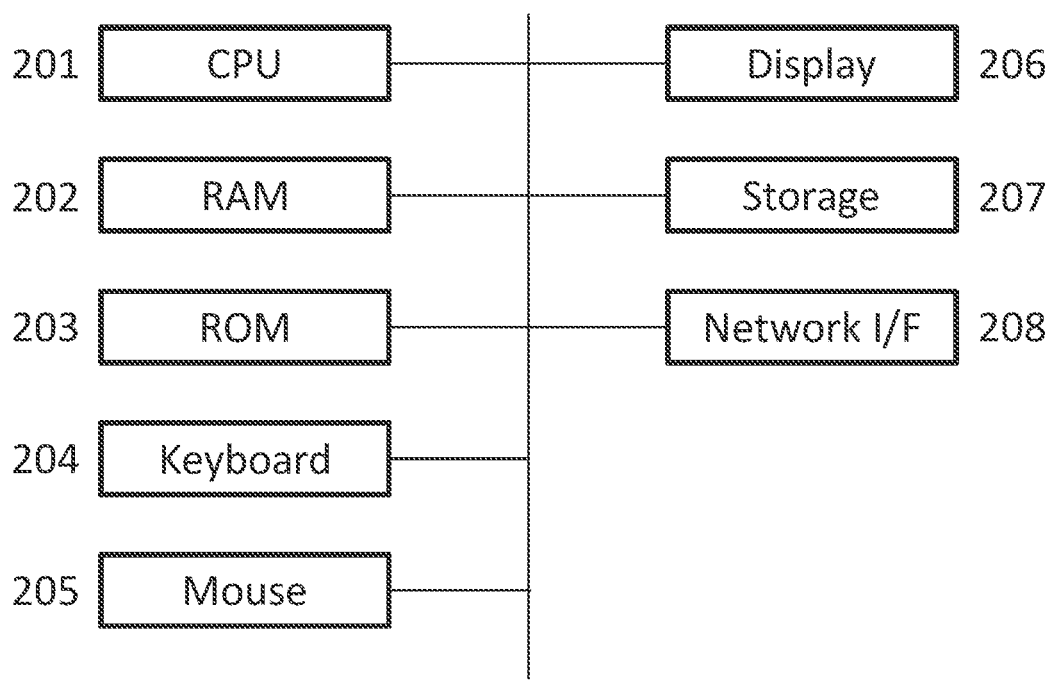
FIG. 2A illustrates an example of a hardware configuration of a client.

FIG. 2A shows selected standard components that are present in the client computer 100. The client computer 100 is an example of the information processing apparatus, and in this embodiment, it is a general-use laptop computer. The client computer 100 has a CPU (Central Processing Unit) 201, a RAM (Random Access Memory) 202, a ROM (Read Only Memory) 203, a keyboard 204, a mouse 205, a display unit 206, an external storage device 207, and a network interface 208 which are all connected to each other via a bus.

The CPU 201 is a standard processor such as those available from Intel® or AMD®. The RAM 202 is a conventional RAM and is used as a temporary storage area for instructions being processed by the CPU 201. The ROM 203 is a memory that stores certain applications for use by the client computer 100, such as the basic input/output system (BIOS). The keyboard 204 and mouse 205 form input devices for the client computer 100 in a conventional manner. The display unit 206 is a thin-film-transistor liquid crystal display (TFT LCD) for providing output display for a user. The external storage device 207 is a removable USB hard disk drive. Network interface 208 is a set of standard components that allows the client computer 100 to communicate over the internal network 110. Such client computers are well known in the art and may include additional components (video cards etc.) or other components.

Figure 2B:
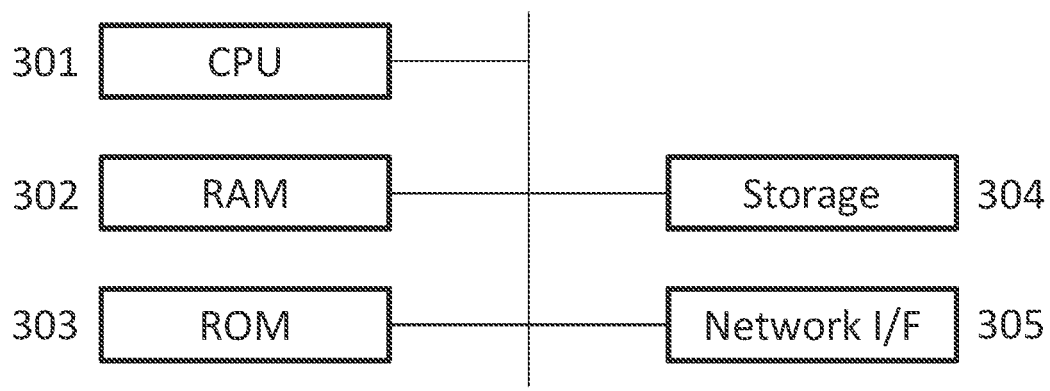
FIG. 2B illustrates an example of a hardware configuration of an on-premise server.

FIG. 2B shows selected standard components that are present in the on-premise server 111. The on-premise server 111 has a CPU 301, a RAM 302, a ROM 303, a storage 304, and a network interface 305 which are all connected each other via a bus. It is possible for those components of the on-premise server 111 to be either distributed to multiple physical locations or integrated in a single housing.

The CPU 301 is a standard processor such as those available from Intel® or AMD®. The RAM 302 is a conventional RAM and is used as a temporary storage area for instructions being processed by the CPU 301. The ROM 303 is a memory that stores certain applications for use by the on-premise server 111, such as the BIOS. The storage 304 is a hard disk drive. Network interface 305 is a set of standard components that allows the on-premise server 111 to communicate over the internal network 110 or the internet. Communication over the internet by the on-premise server 111 using the network interface can be performed either directly or via a proxy.

The cloud service 121 shown in FIG. 1 is a software application hosted on a cloud service platform. The cloud service platform provides an operating system to host the cloud service 121 and allows scalable processing and storage capabilities to allow the cloud service 121 to run. The cloud service platform has hardware and software to provide a service over the internet. Such cloud platforms are well known, such as Microsoft Azure® and Amazon AWS®. Accordingly, description of the hardware of a cloud platform is omitted for brevity.

Figure 2C:
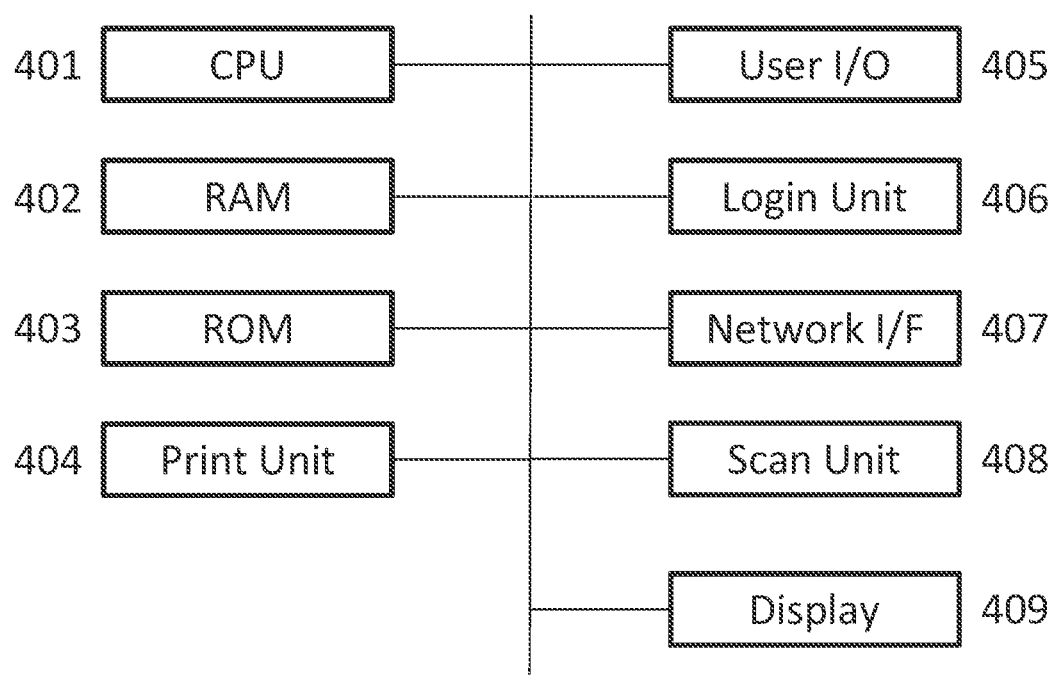
FIG. 2C illustrates an example of a hardware configuration of an MFP.

FIG. 2C shows selected standard components that are present in the MFP 112. The MFP 112 has a CPU 401, a RAM 402, a ROM 403, a print unit 404, a user input/output 405, a login unit 406, a network interface, a scan unit 408, and a display which are all connected to each other via a bus.

The CPU 401 is a standard processor such as those available from Intel® or AMD®. The RAM 402 is a conventional RAM and is used as a temporary storage area for instructions being processed by the CPU 401. The ROM 403 is a memory that stores certain applications for use by the MFP 112, such as the BIOS. The CPU 401 comprises a user interface generation unit that generates the user interface, which is then displayed by the display of the MFP 112.

The print unit 404 could be implemented by an electrophotographic type printer engine or an inkjet type printer engine, and it can print an image on a printing media such as a paper based on the provided data. The scan unit 408 comprises hardware configured to capture the image of a scanned document.

The user input/output 405 includes a plurality of hardware buttons and software buttons which the user can select to provide input to the MFP 112. The user input/output 405 includes a touch screen as part of the display 409. The user input/output 405 includes a keyboard which can be used to enter alphanumeric text such as user ID and password information. Thus, the keyboard is a physical keyboard or a virtual keyboard. The display 409 includes a LCD display, together with touch sensors which provide touch screen functionality.

The user provides the MFP 112 with authentication information, in order to access services that are available from the MFP 112. For registered users, the authentication information corresponds to identification information, which associates the user with a user account. For guest users, the authentication information corresponds to a job code, which identifies job that is to be executed by the MFP 112.

A card reader is an example of a login unit 406, which functions to allow the user to provide the authentication information. The card reader 406 reads out a user ID information from a contactless card. The readout ID is used to identify or authenticate the user who is operating the MFP 112.

An alternative login unit 406 is for the user ID to be input into the MFP 112 by using a keyboard instead of the card reader 406. The keyboard can be used to enter the job code, so that the guest user can identify the job that is to be executed. The authentication of the user or the job can be done in cooperation with a separately-installed authentication server which is provided within each internal network.

Network interface 407 is a set of standard components that allows the MFP 112 to communicate over the internal network 110. Thus, the network interface 407 comprises an input unit and an output unit, which can be used by the MFP 112 to communicate with the on-premise server 111 and the cloud service 121.

The on-premise server 111 and the cloud service 121 confer different functionality, such as providing access to different workflows and also storing different lists of jobs. The print jobs stored on the on-premise server 111 may be received from different locations, such as from a printer driver on a client computer 100, from a mobile device, by email to the print server, etc. Similarly, the cloud service 121 may receive print jobs from the client device 100, and generate print jobs based on documents stored in a cloud drive (such as Google Drive®) etc. The cloud service 121 may store metadata about print jobs, while the print jobs are still stored on the client device 100 waiting to be released to a printer. Accordingly, the print jobs available on the cloud service 121 may differ from those available via the on-premise server 111.

An advantage of this embodiment is to simultaneously provide access to the functionality that is available to both the on-premise server 111 and the cloud service 121. This is achieved by allowing the MFP 112 to be simultaneously registered with both the on-premise server 111 and the cloud service 121.

Various registers are maintained by the on-premise server 111 and the cloud service 121. Registration is the process of updating a register. More particularly, the cloud service 121 has a register of MFP devices that have been registered with it. The on-premise server 111 has a register of MFP devices that have been registered with it. The cloud service 121 also has a register of on-premise servers that have been registered with it.

The MFP 112 has been registered with the cloud service 121 and on-premise server 111, as will be explained in more detail below, and thus the MFP 112 maintains a list of the on-premise server 111 and cloud service 121 that it has been registered with. Accordingly, the MFP 112 includes a register of on-premise servers 111 and cloud services 121 that it has been registered with.

A number of registration methods are available, to get the MFP 112 registered on both the on-premise server 111 and the cloud service 121.

This could be achieved by the MFP 112 registering individually with both the on-premise server 111 and the cloud service 121.

It isn't essential for the on-premise server 111 and the cloud service 121 to communicate with one another, although if this is available, then a number of advantages are provided. As will be explained in connection with FIG. 3A below, registration by the MFP 112 occurs only once, because the MFP 112 can register with one of the on-premise server 111 and cloud service 121, and then the server/cloud service can attend to the registration of the MFP 112 with the other cloud service/server.

The concept of 'locations' will now be explained. The cloud service 121 manages printer installations for a number of different customers. The print systems for particular customers are shown in FIGS. 1A, 1B, and 1C but the skilled person will appreciate that the cloud service 121 can support many separate print systems. In contrast, the on-premise servers are typically print system specific and are not used to support different customer's print systems.

In order to keep different print systems for different customers separate, each customer is associated with a 'tenant' on the cloud service. The information associated with a tenant includes registered on-premise print servers associated with that tenant, registered MFP devices associated with that tenant, registered users for that tenant etc. If a tenant has one or more on-premise servers associated with it, the concept of a location becomes relevant. Each MFP 112, 112A, 112B, 112C associated with a tenant must be managed either by the cloud service 121 or by one of the registered on-premise servers. Management in this context includes providing a login service for the MFP 112.

In order to help an administrator to configure this, the tenant is configured with locations. For example, a tenant might register two locations corresponding to two office buildings at different geographic locations. Each registered MFP device can be associated with a location parameter on the cloud service 121. For example, all MFP devices in a first building might be associated with the first building's location as configured on the tenant. This makes management of MFP devices easier, because a particular location can be used to control which of the on-premise server 111 and the cloud service 121 manages MFP devices associated with that location. For example, the first building's location may be associated with the on-premise server 111 so that all MFP devices in the first building and associated with the first building's location parameter are managed by the on-premise server 111. A location parameter may have additional parameters associated with it, such as a particular IP address range associated with the network at a particular geographic location corresponding to the location parameter.

Figure 3A:
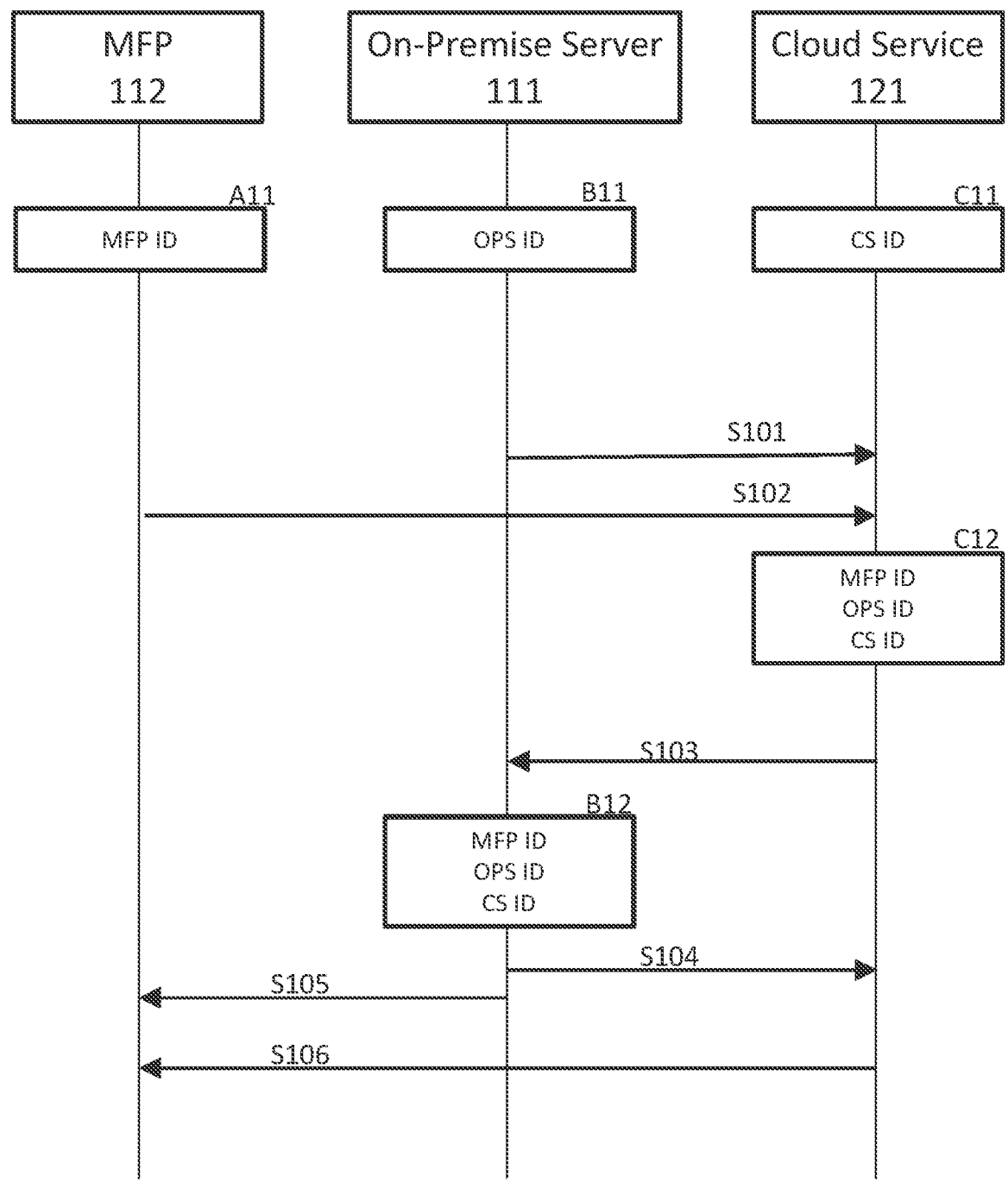
FIG. 3A is a flowchart that illustrates the passing of information between devices, during registration.

FIG. 3A illustrates registration of the MFP 112 with the on-premise server 111 and the cloud service 121. The MFP 112 has a corresponding MFP ID (A11). The MFP ID may include information such as the device serial number, IP address on network 110, etc. Similarly, the on-premise server 111 has an on-premise server ID (B11), and the cloud service 121 has a cloud service ID (C11). Such identities (A11, B11, C11) include names and addresses of their corresponding devices.

In the registration flow shown in FIG. 3A, it is assumed that the on-premise server 111 is first registered with the online service 121, as shown by step S101. This registration step S101 can be performed by accessing the online service from a client 100 using a web browser and manually entering the details of the on-premise server 111, such as on-premise server ID, IP address etc.

The registration step S101 of the on-premise server 111 with the cloud service 121 is achieved by an administrator providing customer details. The administrator enters a tenant serial number or a tenant domain name associated with the on-premise server 111.

If the tenant does not have any locations configured, a message appears that the tenant must have at least one location in order to connect an on-premise server 111. A refresh button is provided, such that the administrator can use a separate browser session to create a location, and continue with the configuration.

By clicking a link, the location configuration for the current tenant opens in a new window.

If the tenant does have at least one location configured, the user can choose a location. A refresh button allows to refresh the shown locations, in case the user simultaneously creates new locations in a different browser session.

If a location is chosen that already is connected to an on-premise server 111 or a remote print server, then an error message appears, informing the user that the selected location is already connected to a different server. The user may go back to choosing a location. As an alternative, that location is simply not selectable, and the 'next' button remains disabled until a valid (free) location is selected.

After choosing a location, the on-premise server 111 is directly connected to that location. Information is generated by the cloud service 121, and transmitted directly to the on-premise server 111. The administrator receives a message confirming a successful connection between the on-premise server 111 and the cloud service 121.

FIG. 3A shows a case in which it is subsequently desired to register a new MFP 112 with both the cloud service 121 and the on-premise server 111.

In step S102, the MFP 112 is registered with the cloud service 121. This may be done in one of three ways:
  Firstly, by manually configuring the MFP 112 details (MFP ID, IP address, etc.) on the cloud service 121 via a web interface.
  Secondly, a setup tool is used on a client device 100 within the internal network 110. The setup tool performs a network search from the client device 100 on the internal network 110 based on IP address and collects discovered MFP ID and IP addresses and then subsequently sends them to the cloud service 121 to register the MFPs on the cloud service 121.
  Thirdly, the MFP 112 may be operated to connect directly to the cloud service 121 and may send a registration request including its MFP ID and IP address information to register with the cloud service 121. FIG. 3A illustrates this technique in step S102, with the MFP transmitting its identification information to the cloud service 121.

The cloud service 121 and the on-premise server 111 are configured to periodically synchronize data relating to users and MFP devices.

When synchronizing a user, the following data is synchronized between the on-premise server 111 and the cloud service: display name, phone number, email identity, Personal identification number, card number identities, user name identities. Note that connecting several on-premise servers may result in several user accounts with a unique email address, which are all mapped to the same, single, cloud service 121 user upon synchronization.

The synchronisation of MFP devices is illustrated by steps S103 to S106.

In step S103, at the next synchronization following the registration of the MFP 112 at the cloud service 121, the cloud service 121 sends a message to the on-premise server 111 that a new device has been registered on the cloud service 121. The new message includes the device IP address, device serial number, device type, name of server or cloud service 121 that should control the MFP (determined based on location information) and a device name. The on-premise server 111 receives and stores the newly registered device information from the cloud service 121 during the synchronization. Confirmation of the registration is transmitted by the on-premise server 111 to the cloud service 121 (S104) and the MFP 112 (S105).

In a case where there are multiple locations and multiple on-premise servers, the message that a new device has been registered in S103 is only sent to the on-premise server with which the new device is associated i.e. the MFP details are sent to the on-premise server that will manage the newly registered MFP and not to any other registered on-premise servers associated with different locations.

Confirmation of registration S106 is sent from the cloud service 121 to the MFP 112. A first confirmation notification identifies that the MFP 121 has successfully registered with the cloud service 121, and a second confirmation notification identifies that the on-premise server 111 has successfully registered with the cloud service 121. This confirmation can be sent by two separate messages, or by a single message.

The confirmation of registration S106 may include the identity of the controller (111, 121) of the MFP 112 if this has already been determined. The identity of the controller (111, 121) could be identified or updated at a later stage, such as at the time of start-up of the MFP 112.

When the MFP device 112 is registered with the cloud service 121, the cloud service 121 may check the IP address of the newly registered MFP 112 against previously configured locations and their associated IP address ranges. If the MFP IP address falls within a preconfigured IP address range, the newly registered MFP 112 will be associated with that location. If there are multiple matching locations or no matching locations, the MFP 112 is not automatically associated with a location. The MFP 112 may be subsequently associated with a location manually by a system administrator or the like.

FIG. 3A illustrates a technique used to register an MFP 112 device with the cloud service 121. Furthermore, the MFP device 112 is also configured to connect to the cloud service 121 if the MFP 112 and cloud service 121 are to communicate with each other. This configuration can be easily done because the location (address) of the cloud service 121 does not change. When the MFP device is initially connected to the internet e.g. on power up, the MFP 112 connects to the cloud service 121 and receives information including its location, if one is set up on the cloud service 121 for that MFP 112, and information indicating whether it is managed by the cloud service 121 or the on-premise server 111. Further details of how the locations of the MFP 112 and the on-premise server 111 are identified is provided below (see FIG. 3D). If the MFP 112 is managed by an on-premise server 111, the cloud service 121 may also send additional information such as IP address of the on-premise server 111 to allow communication between the MFP 112 and the on-premise server 111.

Because of the registration process, the three devices (MFP, on-premise server and cloud service) can communicate with one another. As will be explained in more detail later, the on-premise server 111 and the cloud service 121 can communicate with each other (S106), which enhances the resilience of the system by allowing both of these servers to function as a failover server for processes such as login to the MFP 112. By providing a failover functionality, both the on-premise server 111 and the cloud service 121 permit continued access to the available services, so the MFP 112 continues to function in the event of a failure during use.

Figure 3B:
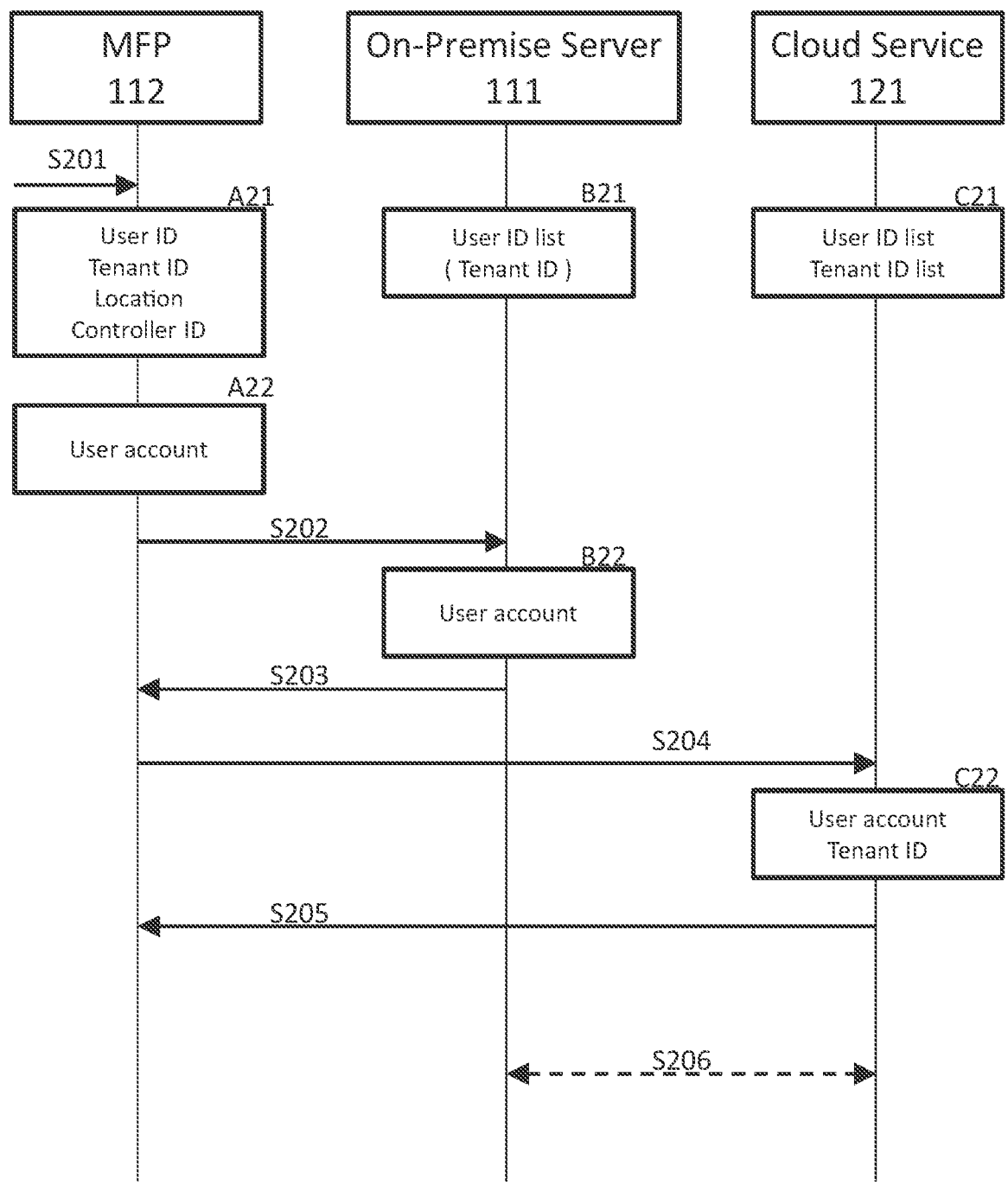
FIG. 3B is a flowchart that illustrates the passing of information between devices, following login with user identification information.

FIG. 3B illustrates login by a user of the MFP 112, to the on-premise server 111 and the cloud service 121. This process happens during normal use of the MFP 112 after the initial set-up and registration described above in connection with FIG. 3A.

In step S201, the user provides the login unit 406 of the MFP 112 with user ID information, which can be achieved by presenting their contactless card at the card unit. As an alternative, the user could enter a username and password via a keyboard. Information (A21) stored by the MFP 112 includes the user ID received from the card reader and the tenant ID which was received when the MFP 112 contacted the cloud service 121 at start-up. Furthermore, the information (A21) stored by the MFP 112 identifies the location of the MFP 112, which is used to determine whether the MFP 112 is controlled by the on-premise server 111 or the cloud service 121.

The information (A21) stored by the MFP 112 indicates which device is to serve as the controller, which is determined to be the on-premise server 111 or the cloud service 121, depending upon which of these controls the MFP 112, in view of the location of the MFP 112.

Further details of how the controller is identified can be found will be described later.

Continuing the description of FIG. 3B, if the MFP 112 is controlled by the on-premise server 111, then the user ID is transmitted S202 to the on-premise server 111. The on-premise server 111 determines whether the authentication is successful, which is achieved by checking whether the user ID matches an existing registered user.

If there is a match, the on-premise server 111 permits access to the corresponding user account B22 on the on-premise server 111. If there is not a match, the login has failed and a failure message is sent back to the MFP 112. The cloud service 121 is not checked for login details. Confirmation of whether login was successful is sent to the MFP S203.

If the MFP 112, instead, is controlled by the cloud service 121, then the user ID is transmitted S204 to the cloud service 121, together with the tenant ID. The MFP 112 sends a HTTP request to the cloud service 121 including the login details. The cloud service 121 checks the login details against the list of registered users and returns an authentication if the login details match a registered user.

As a consequence of the login, in step S206 the on-premise server 111 and the cloud service 121 are permitted to communicate information concerning the particular user accounts B22 and C22. This is particularly advantageous for providing resilience, because if one of the servers becomes temporarily unavailable, then the connection is re-established once the functionality of the server has resumed.

Figure 3C:
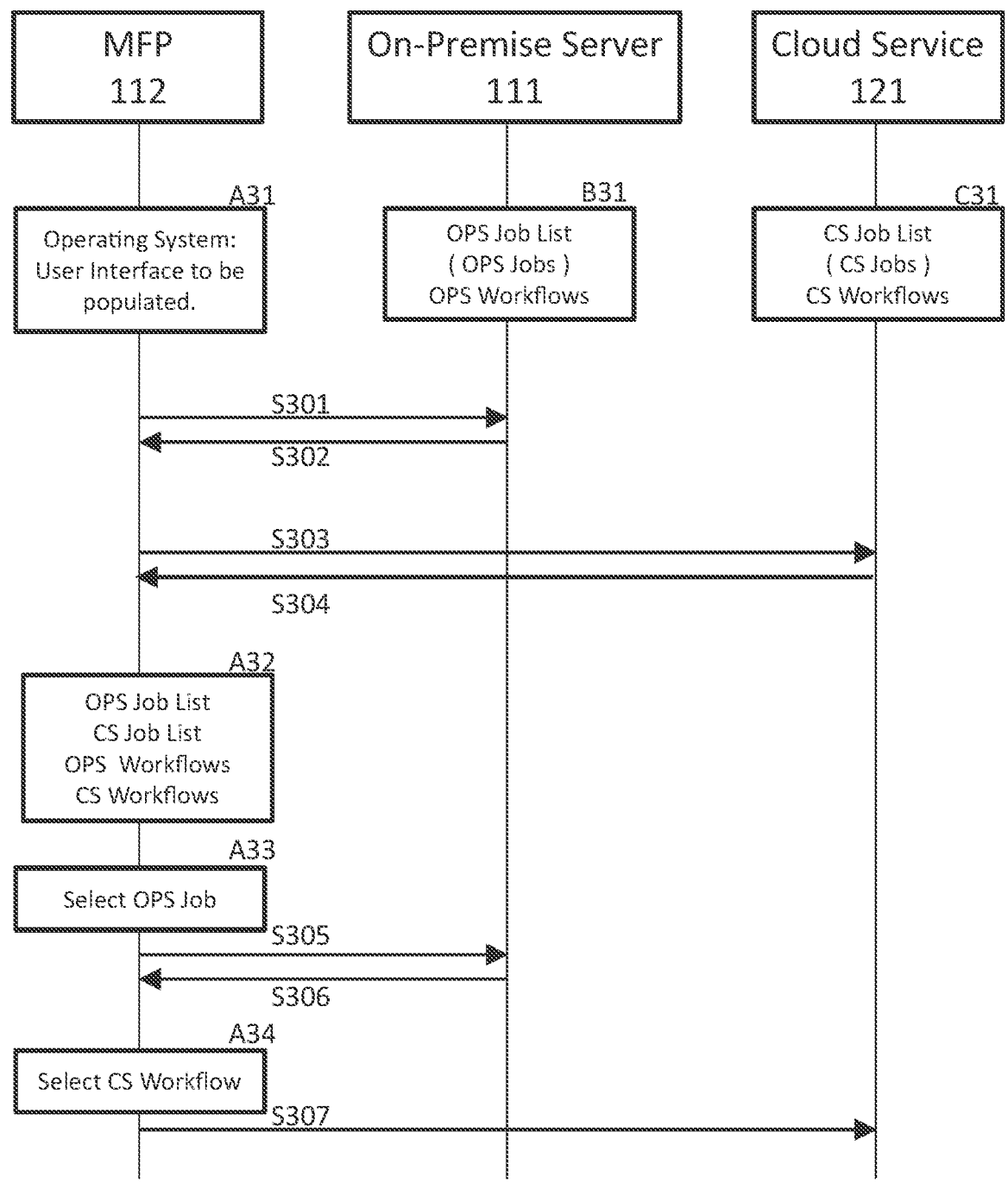
FIG. 3C is a flowchart that illustrates the passing of information between devices, during the performing of a function such as printing or scanning.

FIG. 3C illustrates the execution of a job or a workflow by the MFP 112. After login is completed, as described in connection with FIG. 3B, the user is presented with a user interface that is populated with information received from both the on-premise server 111 and the cloud service 121.

The user interface that is displayed is partly controlled by the operating system of the MFP 112. Elements of the user interface are populated A31 with information about available services. Some of the content to be displayed is stored in the memory of the MFP 112. In addition, content to be displayed is stored by the on-premise server 111 and the cloud service 121.

The on-premise server 111 stores information B31 to be transmitted to the MFP 112. The information B31 includes a job list, and may also include the jobs themselves. However, it is possible instead that the jobs continue to be stored somewhere else such as the client computer 100 to be retrieved once a job has been selected for printing. In addition, the information B31 also includes workflows that can be executed by the on-premise server 111 once they have been selected.

The cloud service 121 stores information C31 to be transmitted to the MFP 112. The information C31 includes a job list, and may also include the jobs themselves. However, it is possible instead that the jobs continue to be stored somewhere else such as the client computer 100 to be retrieved once a job has been selected for printing. In addition, the information C31 also includes workflows that can be executed by the cloud service 121 once they have been selected.

The MFP 112 determines whether the MFP 112 is controlled by the on-premise server 111 or the cloud service 121. If the MFP 112 is controlled by the on-premise server 111, then the user interface is populated with jobs following steps S301-S302 and S303-S304. If the MFP 112 is controlled by the cloud service 121, then the user interface is populated with job following steps S303-S304, because there is no connection available to an on-premise server 111. Thus, the MFP 112 receives controller information which identifies either the on-premise server 111 or the cloud service 121 as a controller (111, 121) of the MFP 112.

In step S301, the MFP 112 contacts the on-premise server 111 and requests information B31 relating to a specific user account. In step S302, the on-premise server 111 transmits to the MFP 112 the information B31 relating to the specific user account.

In step S303, the MFP 112 contacts the cloud service 121 and requests information C31 relating to a specific user account. In step S304, the cloud service 121 transmits to the MFP 112 the information C31 relating to the specific user account.

The MFP 112 collates the information B31 and C31 received from the on-premise server 111 and the cloud service 121. Thus, the user interface of the MFP 112 is populated with information A32 that corresponds to the job lists and the workflows of the available servers.

For example, the user can select A33 a job that is available from the on-premise server 111. As a consequence, a request S305 is transmitted to the on-premise server 111, and in response S306 the requested print job is received by the MFP 112.

For example, the user can select A34 a workflow that can be performed by the cloud service 121. As a consequence, a request S307 is transmitted to the cloud service 121, and the workflow is then executed by the cloud service 121.

Advantageously, the user interface A32 displays the functionality of both the on-premise server 111 and the cloud service 121. The user interface is dynamic in that as functionality becomes available, the user interface is updated to demonstrate changes to the available functionality. As a consequence, if the cloud service 121 is updated to include new workflows, then the user interface of the MFP 112 is updated to introduce this new functionality, while also offering the functionality that is available via the on-premise server 111. Furthermore, if one of the servers becomes temporarily unavailable, the user interface is restricted to offering the functionality, until full service has resumed.

Figure 3D:
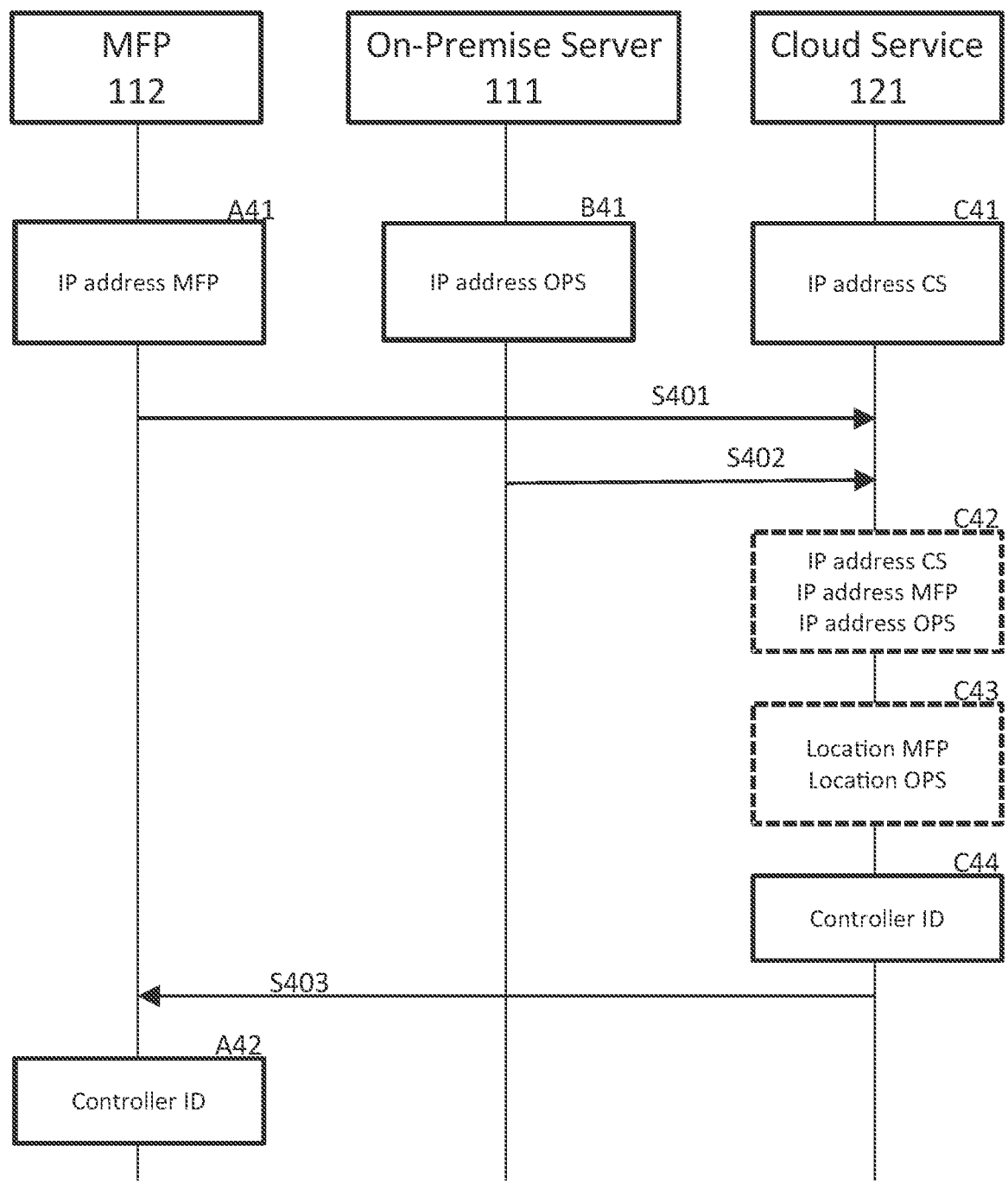
FIG. 3D is a flowchart that illustrates the passing of information between devices, during identification of a controller of the MFP as either the on-premise server or the cloud service.

FIG. 3D illustrates possible techniques for the MFP to determine whether it is controlled by the on-premise server 111 or the cloud service 121.

The identity information of the MFP 112 includes an IP address (A41). The identity information of the on-premise server 111 includes an IP address (B41). The identity information (C41) of the cloud service 121 includes, for example, a uniform resource locator (URL, ie. a web address) or an IP address.

As discussed above, a first technique that can be used to determine the controller (111, 121) is for the controller ID to be confirmed (S106) at the time of registration. The controller ID information is stored by the memory of the MFP 112, which the MFP 112 can look up to confirm whether it is controlled by the on-premise server 111 or the cloud service 121.

If the controller (111, 121) has already been confirmed (S106), it will be possible to retrieve services from the controller (111, 121) without performing the techniques shown in FIG. 3D. Nevertheless, even if the controller (111, 121) has already been confirmed, it is still worthwhile to update the controller ID, which typically occurs at the time of start-up of the MFP 112.

If the MFP 112 is moved, performing the registration process (FIG. 3A) again would ensure that the correct controller (111, 121) is identified (S106). However, providing an update (FIG. 3D) to the identity of the controller (111, 121) ensures that the registration process (FIG. 3A) does not need to be performed again.

A second technique that can be used to determine the controller (111, 121) is for the controller ID (C44) to be stored by the memory of the cloud service 121. The identity of the controller (111, 112) can be determined at the time of registration (FIG. 3A) and stored by the memory of the cloud service 121.

In step S401, the MFP 112 sends its identity information A41 to the cloud service 121. The identity of the controller ID (C44) is retrieved from the memory of the cloud service 121. In step S403 the controller ID is communicated to the MFP 112 (A42).

A third technique that can be used to determine the controller (111, 121) is for the controller ID (C44) to be updated before being confirmed to the MFP 112. As a result, the identity of the controller (111, 121) is dynamic. This allows the MFP 112 to be moved, and the identity of the controller (111, 121) to be updated accordingly. This third technique is illustrated in detail by FIG. 3D:

In step S401, the MFP 112 sends its identity information A41 to the cloud service 121. If the identity information A41 is sent by the MFP 112 to the cloud service 121 at the time of start-up of the MFP 112, this facilitates the controller being identified at the time of start-up, thus accommodating the possibility that the MFP 112 has been moved to a different location.

In step S402, the on-premise server 111 sends its identity information A42 to the cloud service 121. Accordingly, the memory of the cloud service 121 stores the IP address of the IP addresses of the MFPs 112 and servers 111 that have registered with it (C42).

The cloud service 121 is configured to associate a first location with the IP address of the on-premise server 111, and associate a second location with the MFP 112. Thus, the cloud service 121 stores the first location of the MFP 112 and the second location of the on-premise server 111 (C43).

If the IP address of the MFP 112 and the on-premise server 111 are within a particular range, then the second location is considered to correspond to the first location. This indicates that the MFP 112 and the on-premise server 111 are part of the same internal network 110. In this case, it is determined that the controller of the MFP 112 should be the on-premise server 111.

If the IP address of the MFP 112 and the on-premise server 111 are outside a particular range, then the second location is considered to not correspond to the first location. This indicates that the MFP 112 and the on-premise server 111 are not part of the same internal network 110. In this case, it is determined that the controller of the MFP 112 should be the cloud service 121.

As an alternative, the locations of the MFP 112 and the on-premise server 111 are entered manually into the memory of the cloud service 121. Thus, it is not essential for the location of the MFP 112 to be determined based upon the IP address of the MFP 112.

Thus, the cloud service 121 determines whether the controller of the MFP 112 should be the on-premise server 111 or the cloud service 121, based on whether the MFP 112 is part of the same internal network 110 as the on-premise server 111. Thus, the cloud service 121 stores the identity of the controller of the MFP 112, as either the cloud service 121 or the on-premise server 111 (C44).

Once the controller (111, 121) has been identified, in step S403 this information is communicated to the MFP 112 (A42).

Returning to FIG. 1C, various comments about how this print system works can now be made. Location A in the print system has an on-premise server 111A, MFP 112A, and client 100A which communicate via network 110A. Location B has an on-premise server 111B, MFP 112B, and client 100B which communicate via network 110B. Location C has an MFP 112C and client 100C which communicate via network 110C, although location C does not include an on-premise server. Locations A-C are configured to communicate with cloud service 121 via external network connections 120A-C.

The cloud service 121 associates each of the plurality of on-premise servers 111A-B with a location A-B. The on-premise servers and locations are associated on a one-to-one basis such that each on-premise server has a unique location. As described previously, the cloud service 121 determines a location A-C of each multi-function devices 112A-C based on the identification information of the multi-function devices 112A-C. Location C does not have an on-premise server, so MFP 112C in location C is managed by the cloud service 121.

The cloud service 121 identifies the on-premise server 111A as the controller of the multi-function device 111A, because the location A of the multi-function device 112A corresponds to the location A of the on-premise server 111A.

Similarly, the cloud service 121 identifies the on-premise server 111B as the controller of the multi-function device 111B, because the location B of the multi-function device 112B corresponds to the location B of the on-premise server 111B.

The cloud service 121 identifies the identify the cloud service 121 as the controller of multi-function device 111C, because the second location C of the multi-function device 112C does not correspond to the location A-B of any of the plurality of on-premise servers 111A-B.

Advantageously, it is possible to move any of the multifunctional devices 112A-C between the different locations A-C, and upon synchronisation, the correct controller for the multi-function device 112A-C is identified and changed without any action being required by the user or the administrator.

More generally, the controller (111, 121) is responsible for performing several functions, such as login (see FIG. 3B). However, if the controller (111, 121) is not available, then another technique is required in order to perform the function, until the controller (111, 121) is once again available.

If the controller information identifies the on-premise server 111 as the controller of the MFP 112, but the server is not available to receive the authentication information, then the authentication information is sent to the cloud service 121. Thus, the cloud service 121 provides a fall-back so that login can be achieved even when the on-premise server 111 is not available.

If the controller information identifies the cloud service 121 as the controller of the MFP 112, but the cloud service 121 is not available to receive the authentication information, then the MFP 112 is configured to process the authentication request. Thus, the MFP 112 enters an emergency mode. In the emergency mode, the MFP 112 is configured to deny access to any users, thus ensuring a high level of security. Alternatively, in the emergency mode, the MFP 112 is configured to allow access to all users, thus ensuring that functions can be performed by the MFP 112 even when the connection with the cloud service 121 cannot be established.

Once the controller (111, 121) becomes available again, the function is then performed by the controller (111, 121).

Figure 3E:
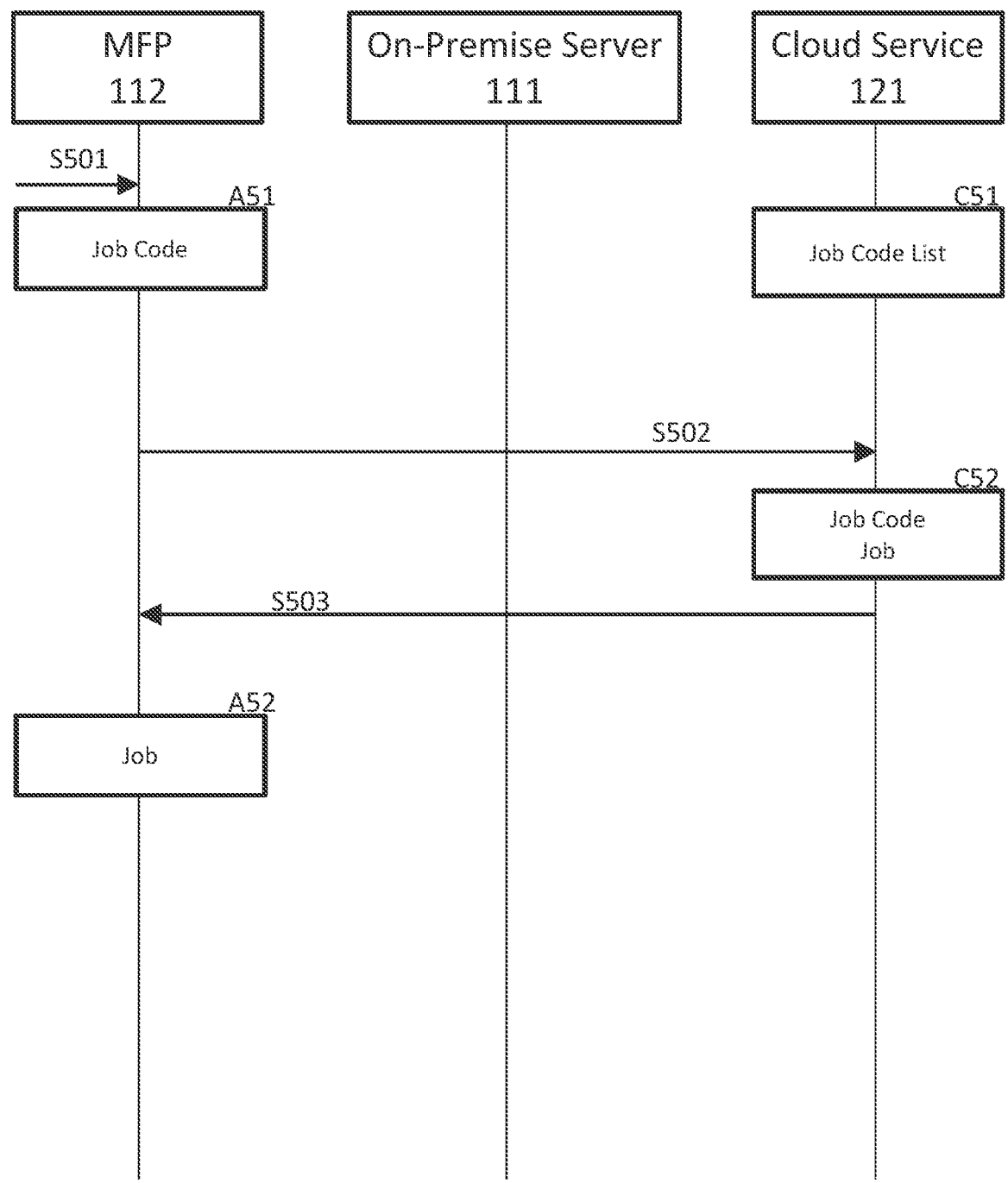
FIG. 3E is a flowchart that illustrates the passing of information between devices, following login with job code information.

FIG. 3E shows a workflow, different from the user log-in process described in connection with FIG. 3B, in which the user provides the login unit 406 of the MFP 112 with a job code. This workflow follows the registration of FIG. 3A, and is provided in addition to the workflows provided by FIGS. 3B to 3D. It should be noted that it is not necessary for a user to log-in in order to use the workflow shown in FIG. 3E, accordingly both workflows 3B and 3E may be provided and the work flows are not incompatible. Typically, both workflows of FIG. 3B and FIG. 3E will be available to choose from.

By way of background to FIG. 3E, a user may send a job to the cloud service 121 and receive in reply a job code with which the cloud service 121 associates the print job. This may be done, for example, by submitting a job to the cloud service through a web interface or by sending the print job to the cloud using a printer driver or email. In each case the cloud service returns the job code, either by causing the job code to be displayed to the user, by sending the user an email including the job code or by some other method.

In step S501, the user is present at the MFP 112 and identifies a job by entering the job code A51 on the MFP. In this way, the user can retrieve a job associated with a job code rather than associating the job with a specific user's log-in details. This can be useful, for example, for guest printing on a network when you do not want to go to the trouble of creating a user profile associated with a guest user.

In step S502, the MFP 112 transmits the entered job code A51 to the cloud service 121. The cloud service 121 checks whether the job code is associated with a print job on a job code list C51 that is maintained by the cloud service 121. If the job code list C51 does include the job code A51, then a job is identified that corresponds to job code. This job may be already stored by the cloud service 121. Alternatively, the job may be stored by a different server or the client 100, and in this case, the cloud service 121 will retrieve the job corresponding to the job code. If there is no matching job code in the job code list of the cloud service 121, then an error message is transmitted to the MFP 112.

In step S503, the job corresponding to the job code C52 is transmitted to the MFP 112. Upon receiving the job A52, the MFP 112 is configured to execute the job, typically by printing out the job associated with the job code.

For the situation in which the user provides a job code A51, the MFP 112 communicates with the cloud service 121. Thus, for a situation in which the job is to be associated with a job code, the client 100 is configured to transmit the job to the cloud service 121. As a consequence of the job code list being maintained by the cloud service 121, the user can retrieve the job by using an MFP 112A-C that is based at any location A-C.

This functionality is beneficial to guest users, where the user isn't actually identified. By way of example, the guest user sends a print job via email, which is transmitted from the client 100 to the cloud service 121. The cloud service 121 generates a job code and sends it back to the user via email. At the MFP 112, the user enters the job code, rather than identify themselves. Hence even for the situation in which the MFP 112 is controlled by the on-premise server 111 only, the job code can be generated by cloud service 121 and the MFP 112 will still ask the cloud service 121, in case a job code has been entered.

An advantage of this functionality is that the job code workflow is much easier to configure with the cloud service 121 than with the on-premise server 111. Hence, on-premise server 111 customers can benefit by using the cloud service 121 for their guest users, even though 'normal' users have the on-premise server 111 identified as the controller in this case.

As an alternative, the job code can instead be sent to the controller that is identified by FIG. 3D, which will be either the on-premise 111 or the cloud service 121. With this arrangement, job code list is maintained by the controller. When the client 100 transmits a job to the controller. If the controller is the cloud service 121, then the MFP 112 will access the job code list as explained above relating to FIG. 3E.

If the controller is identified as the on-premise server 111, the job is instead registered with the on-premise server 111. A job code is generated by the on-premise server 111, and sent by email to the client 100. The job can be stored on the on-premise server 111 or the client 100. When the MFP 112 sends the job code to the on-premise server 111, if the job code is included in the job code list, then the job is transmitted to the MFP 112.

If the job code is not included in the job code list of the on-premise server 111, then a request is sent to the cloud service 121 by the on-premise server 111, to check whether the job code is included in the job code list of the cloud service 121. If the job code is not included in the job code list of the on-premise server 111 or the job code list of the cloud service 121, then the on-premise server 111 sends an error message to the MFP 112.

Figure 4A:
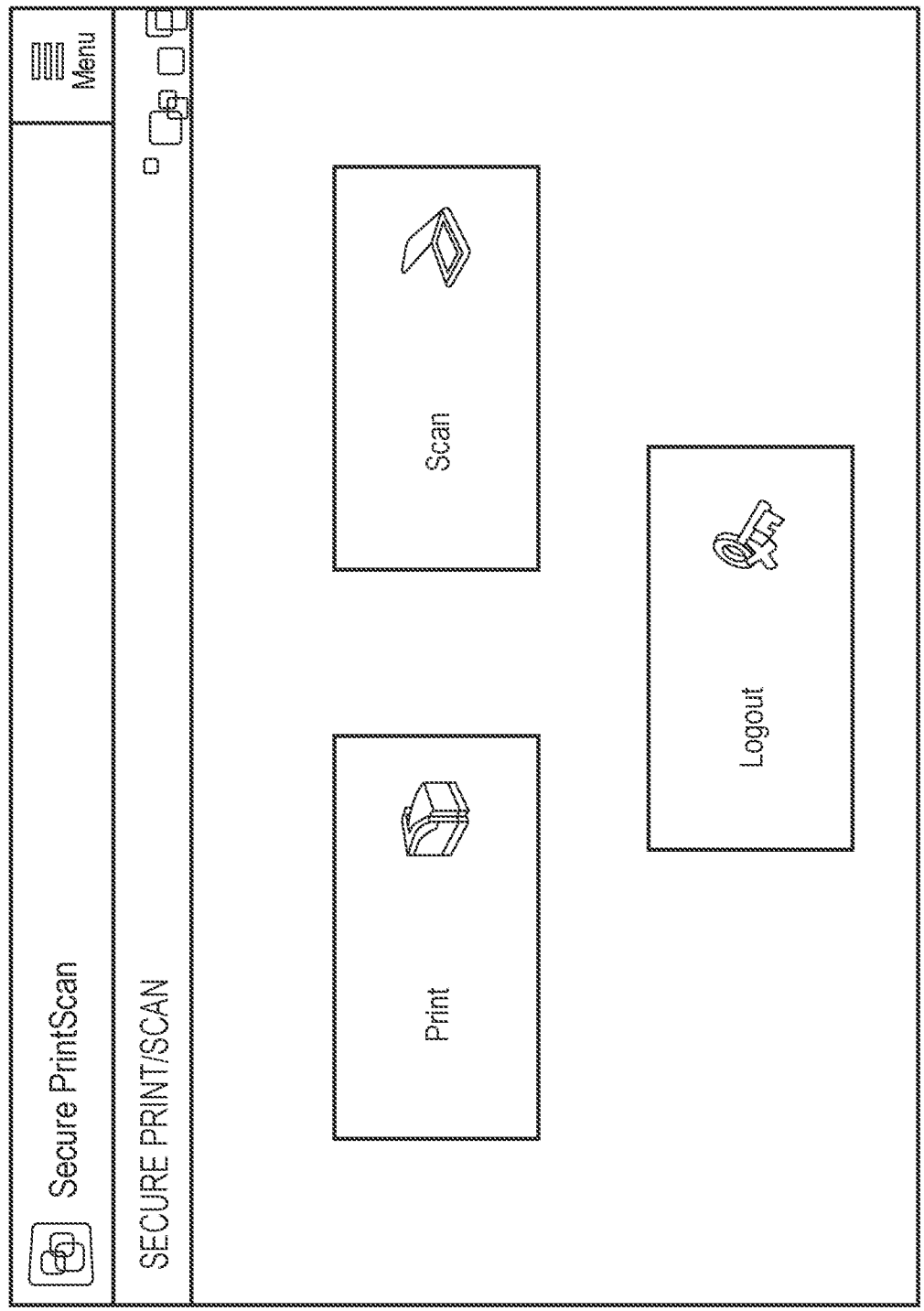
FIGS. 4A-C illustrate a user interface for an operating system running on the MFP, the user interface configured to facilitate a variety of functions, including printing and scanning.
Figure 4B:
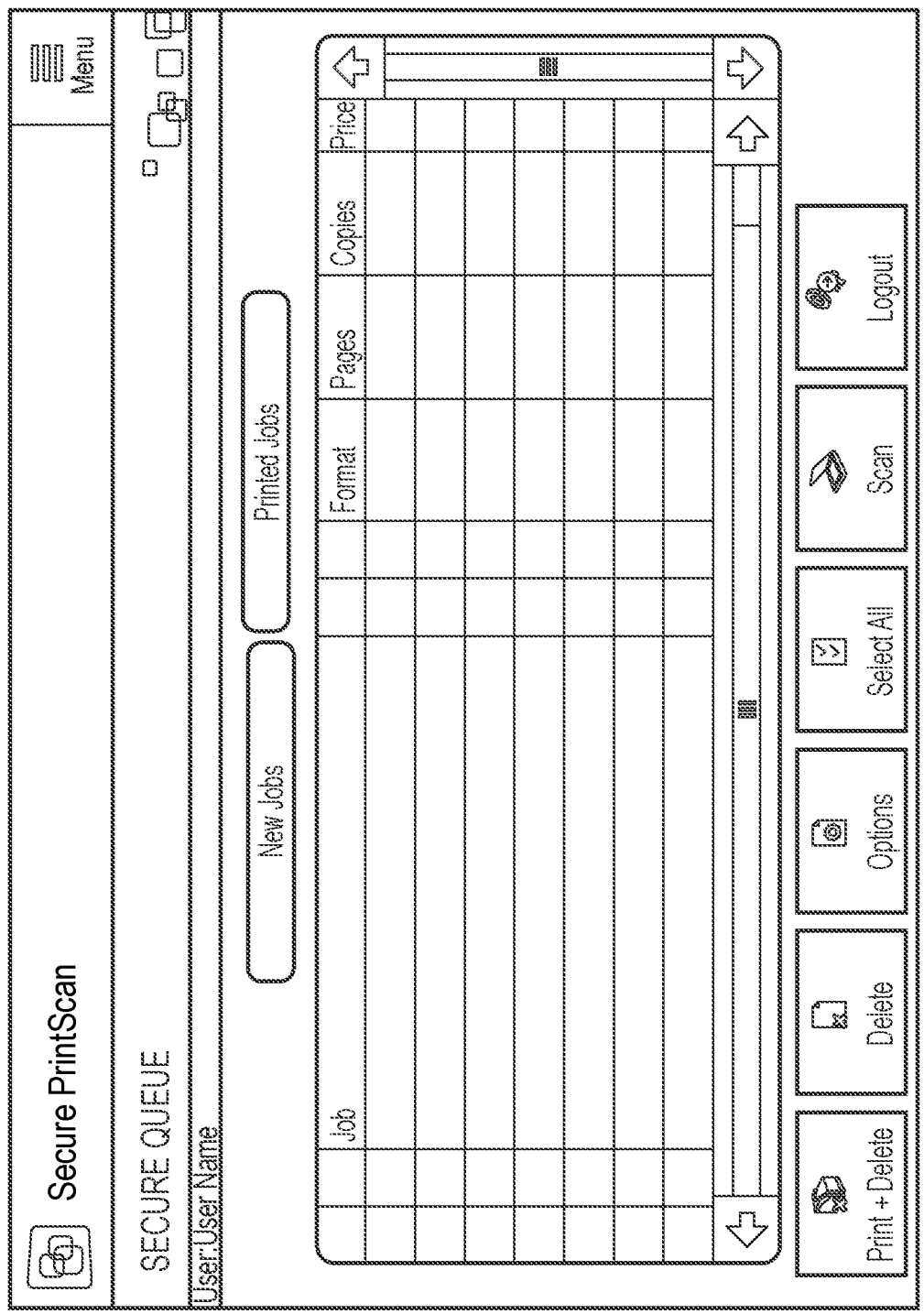
Figure 4C:
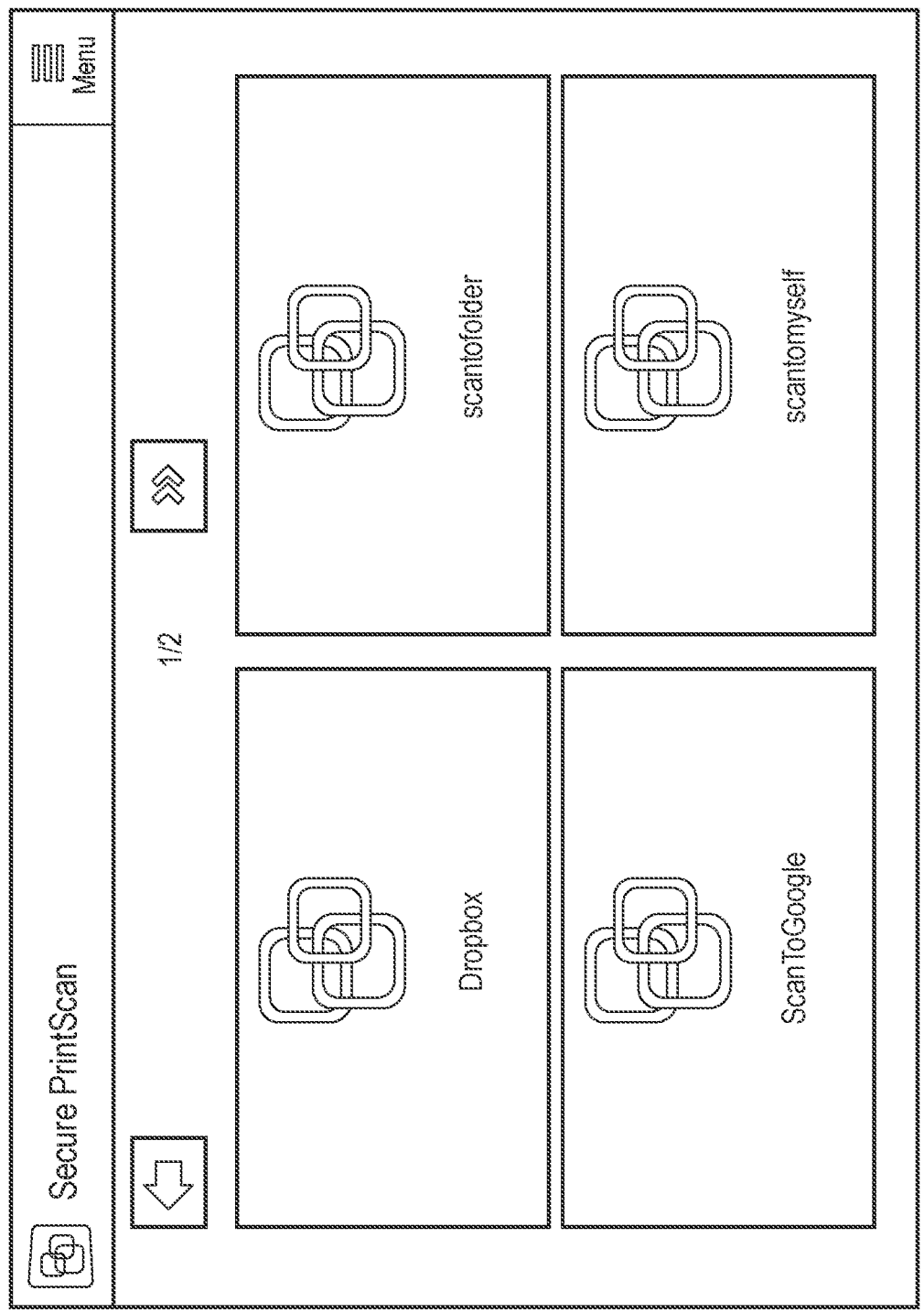

FIGS. 4A-4C illustrate details of the user interface that is displayed by the MFP 112 once a user has logged in to the MFP 112. The 'Secure PrintScan' user interface provides an example of such a user interface that is provided by uniFLOW software (registered trade mark), which is available from NT-Ware Systemprogrammierungs GMBH (registered trade mark).

FIG. 4A shows a menu that is used to determine the function to be performed by the MFP 112. The user interface includes a 'Print' icon, a 'Scan' icon, and a 'Logout' icon.

The user input/output 405 of the MFP 112 allows a user to select between the icons presented by the display 409.

If the user selects the 'Print' icon, then the user interface advances to the menu shown by FIG. 4B. If the user selects the 'Scan' icon, then the user interface advances to the menu shown by FIG. 4C. If the user selects the 'Logout' icon, then the user is logged out from the MFP 112.

If a function is not available, the corresponding icon is temporarily removed from the user interface, and reinstated once the function becomes available. Alternatively, the icon can be modified to indicate that it is not available, with the possibility to select the icon being suspended.

FIG. 4B shows a user interface that is displayed if the user selects the 'Print' icon. The user interface includes a list of print jobs, a 'Print+Delete' icon, a 'Delete' icon, an 'Options' icon, a 'Select All' icon, a 'Scan' icon, and a 'Logout' icon. The user interface further includes a 'New Jobs' icon and a 'Printed Jobs' icon. The user interface presents the User Name, to confirm to the user that the print jobs relate to their user account.

The user can navigate the operating system to access the available print jobs. The operating system presents a list of print jobs that is created from the job lists provided by both the on-premise server 111 and the cloud service 121 as described previously in connection with FIG. 3C. The selection of a print job from the print job list results in the print job being sent to the MFP 112 to be printed.

The user can navigate the operating system to access the available print workflows. The selection of a print workflow results in the MFP 112 performing a print operation according to designated settings. An example of a print workflow is a finishing function, such as providing color options, or binding options.

The print jobs list is presented in a table format, providing details of the job, format, number of pages, number of copes to be printed, and the price of the print job. Furthermore, the table includes additional columns which can be used to display icons to the user that identify attributes of the print job such as whether the print job is in color or black & white. Scroll bar can be used to navigate up/down and left/right, to access parts of the table that are not presently being displayed.

The user can select a number of print jobs that are displayed in the print job list. Alternatively, the user can select all of the print jobs by selecting the 'Select All' icon.

If the user selects the 'Print+Delete' icon, then the MFP 112 executes a workflow to print all of the selected print jobs, and delete the print job from the print job list. If the user selects the 'Delete' icon, then the MFP 112 executes a workflow to delete all of the selected print jobs, without printing them. If the user selects the 'Options' icon, then the MFP 112 provides access to adjust print job settings.

If the user selects the 'Scan' icon, then the user interface advances to the menu shown by FIG. 4C. If the user selects the 'Logout' icon, then the user is logged out from the MFP 112.

If the user selects the 'New Jobs' icon, then the user interface presents the user with jobs that have not yet been printed. If the user selects the 'Printed Jobs' icon, then the user interface presents the user with a list of jobs that were previously printed.

FIG. 4C shows a user interface that is displayed if the user selects the 'Scan' icon. The user interface includes a 'Dropbox' icon, a 'scantofolder' icon, a 'ScanToGoogle' icon, and a 'scantomyself' icon.

If the user selects the 'Dropbox' icon, then the MFP 112 executes a workflow to scan to an external storage function, such as DropBox (registered trade mark). If the user selects the 'scantofolder' icon, then the MFP 112 executes a workflow to scan to an internal storage function, such as on the memory of the client 101. If the user selects the 'ScanTo-Google' icon, then the MFP 112 executes a workflow to scan to a cloud storage function of the cloud service, such as is provided by Google Drive (registered trade mark). If the user selects the 'scantomyself' icon, then the MFP 112 executes a workflow to scan to an email address associated with the user.

The user can navigate the user interface to access the available scan workflows. The selection of a scan workflow results in the MFP 112 performing a scan operation according to designating settings, such as determining the size of the image to be scanned, or the performing of character recognition on specific parts of the image. Furthermore, the scan workflow determines what should be done with the scanned information such as editing the image, determining the filename, transmitting the document to the user via email, or printing out a copy of the scanned information.

The user interface is provided by the controller, which is determined in accordance with FIG. 3D to be the on-premise server 111 or the cloud service 121. The controller (111, 121) provides a user interface that includes first information stored by the on-premise server 111 and second information stored by the cloud service 121. The user interface is then transmitted by the controller to the MFP 112, which is then rendered and displayed by the MFP 112. Thus, the MFP 112 is configured to generate a user interface based on the first information received from the on-premise server 111 and the second information received from the cloud service 121.

The above examples can also be realised by a computer of a system or apparatus (or devices such as a CPU or MPU) that reads out and executes a program recorded on a memory device to perform the functions of the above-described examples, and by a method, the steps of which are performed by a computer of a system or apparatus by, for example, reading out and executing a program recorded on a memory device to perform the functions of the above-described examples. For this purpose, the program is provided to the computer for example via a network or from a recording medium of various types serving as the memory device (e.g., a computer-readable medium such as a non-transitory computer-readable medium).

While the present invention has been described with reference to embodiments, it is to be understood that the invention is not limited to the disclosed embodiments. The present invention can be implemented in various forms without departing from the principal features of the present invention. The scope of the following claims is to be accorded the broadest interpretation so as to encompass all such modifications and equivalent structures and functions.

The invention claimed is:

1. A multi-function device configured to communicate with both a server and a cloud service, the multi-function device comprising:
   an output unit configured to send identification information of the multi-function device to the cloud service;
   an input unit configured to receive controller information which identifies either the server or the cloud service as a controller of the multi-function device; and
   a login unit configured to receive authentication information;
   wherein the output unit is further configured to send an authentication request including the authentication information to the controller identified by the controller information; and
   wherein the input unit is further configured to receive an authentication response from the controller that indicates whether or not the authentication information is accepted.

2. The multi-function device according to claim 1, wherein:
   if the controller information identifies the server as the controller of the multi-function device, but the server is not available to receive the authentication information, then the authentication information is sent to the cloud service.

3. The multi-function device according to claim 1, wherein:
if the controller information identifies the cloud service as the controller of the multi-function device, but the cloud service is not available to receive the authentication information, then the multi-function device is configured to process the authentication request.

4. The multi-function device according to claim 1, wherein:
the input unit is further configured to receive first information from the server and second information from the cloud service.

5. The multi-function device according to claim 4, further comprising:
a user interface generation unit configured to generate a user interface based on the first information received from the server and the second information received from the cloud service.

6. The multi-function device according to claim 5, wherein:
the first information comprises a first list of jobs;
the second information comprises a second list of jobs; and
the user interface generation unit generates the user interface based on the first list of jobs and the second list of jobs.

7. The multi-function device according to claim 5, wherein:
the first information comprises information identifying a first workflow;
the second information comprises information identifying a second workflow; and
the user interface generation unit generates the user interface to display icons for accessing the first workflow and the second workflow.

8. The multi-function device according to claim 5, wherein:
the user interface generation unit is configured to update the user interface if there is an update of the first information or the second information.

9. The multi-function device according to claim 1, wherein:
the output unit is configured to send the identification information of the multi-function device to the cloud service at the time of start-up of the multi-function device.

10. The multi-function device according to claim 1, wherein:
the authentication information comprises a user identification, wherein the user identification provides a user of the multi-function device with access to available services.

11. The multi-function device according to claim 1, wherein:
the authentication information comprises a job code identification, wherein the job code provides a job to be executed by the multi-function device.

12. A system comprising:
the multi-function device according to claim 1;
a server; and
a cloud service.

13. The system according to claim 12, wherein:
the cloud service comprises a memory configured to store a register,
wherein the cloud service updates the register when the output unit of the multi-function device sends the identification information of the multi-function device to the cloud service.

14. The system according to claim 12, wherein:
the cloud service is configured to transmit to the server the identification information of the multi-function device.

15. The system according to claim 12, wherein:
the cloud service is configured to:
associate the server with a first location;
determine a second location of the multi-function device based on the identification information of the multi-function device;
identify the server as the controller if the second location of the multi-function device corresponds to the first location of the server; and
identify the cloud service as the controller if the second location of the multi-function device does not correspond to the first location of the server.

16. The system according to claim 12, comprising:
a plurality of servers;
wherein the cloud service is configured to:
associate the plurality of servers each with a respective location;
determine a location of the multi-function device based on the identification information of the multi-function device;
identify a server of the plurality of servers as the controller if the location of the multi-function device corresponds to the location of the server of the plurality of servers; and
identify the cloud service as the controller if the second location of the multi-function device does not correspond to the location of any of the plurality of servers.

17. The system according to claim 12:
wherein the controller is configured to create the user interface based on the first information and the second information, and transmit the user interface to be generated by the multi-function device.

18. A method of configuring a multi-function device to communicate with both a server and a cloud service, the method comprising:
the multi-function device sending identification information of the multi-function device to the cloud service;
the multi-function device receiving controller information which identifies either the server or the cloud service as a controller of the multi-function device;
the multi-function device receiving authentication information;
the multi-function device sending an authentication request including the authentication information to the controller identified by the controller information; and
the multi-function device receiving an authentication response from the controller that indicates whether or not the authentication information is accepted.

19. A non-transitory computer-readable storage medium storing a program which when executed by a multi-function device configures a multi-function device to communicate with both a server and a cloud service, the program configured to execute a method comprising:
the multi-function device sending identification information of the multi-function device to the cloud service;
the multi-function device receiving controller information which identifies either the server or the cloud service as a controller of the multi-function device;
the multi-function device receiving authentication information;

the multi-function device sending an authentication request including the authentication information to the controller identified by the controller information; and the multi-function device receiving an authentication response from the controller that indicates whether or not the authentication information is accepted.

\* \* \* \* \*